United States Patent [19]
Kangas et al.

[11] Patent Number: 5,137,984
[45] Date of Patent: Aug. 11, 1992

[54] NON-HAIRING, MOISTURE CURABLE COMPOSITIONS

[75] Inventors: Lani S. Kangas; Charles W. Stobbie, IV, both of St. Paul, Minn.

[73] Assignee: Minnesota Mining and Manufacturing Co., St. Paul, Minn.

[21] Appl. No.: 523,754

[22] Filed: May 15, 1990

Related U.S. Application Data

[63] Continuation of Ser. No. 201,169, Jun. 2, 1988, abandoned.

[51] Int. Cl.$^5$ .................. C08L 67/02; C08L 67/04; C08G 18/28
[52] U.S. Cl. .................... 525/411; 525/415; 525/437; 525/440; 525/444
[58] Field of Search ............... 525/411, 440, 444, 437

[56] References Cited

U.S. PATENT DOCUMENTS

| | | | |
|---|---|---|---|
| 3,931,077 | 1/1976 | Uchigaki et al. | 260/26 |
| 4,059,715 | 11/1977 | Pletcher | 428/349 |
| 4,092,202 | 5/1978 | Bergk et al. | 156/331 |
| 4,352,858 | 10/1982 | Stanley | 428/423.1 |
| 4,357,441 | 11/1982 | Hamamura et al. | 524/591 |
| 4,404,345 | 9/1983 | Janssen | 526/206 |
| 4,585,819 | 4/1986 | Reischle et al. | 524/196 |

FOREIGN PATENT DOCUMENTS

| | | |
|---|---|---|
| 52280/86 | 6/1988 | Australia . |
| 55264/86 | 2/1989 | Australia . |
| 53964/86 | 5/1989 | Australia . |
| 53378/86 | 9/1989 | Australia . |
| 53399/86 | 10/1989 | Australia . |
| 0232055A2 | 8/1987 | European Pat. Off. . |
| 58-93767 | 6/1988 | Japan . |
| 2065690A | 7/1981 | United Kingdom . |
| 2137638A | 10/1984 | United Kingdom . |

OTHER PUBLICATIONS

Encyclopedia of Chemical Technology, Kirk–Othmer, 2nd Ed., vol. 12 Interscience Publ., N.Y. (1967), pp. 46–47.
Polymer-Polymer Miscibility, Olabisi et al., Academic Press, N. Y. (1979), p. 2.

Primary Examiner—Patricia Short
Attorney, Agent, or Firm—Gary L. Griswold; Walter N. Kirn; Steven E. Skolnick

[57] ABSTRACT

A mixture of hydroxy functional polymers which can be used to form isocyanate prepolymers which are non-hairing at application temperature are disclosed. Examples of suitable mixtures of hydroxy functional polymers that can be used to form the prepolymers are:

(1) linear polyester blends, comprising a first and second polyester wherein each polyester is the reaction product of a polyol and a polyacid, wherein $$a+b < \text{or} = 4, c+d > \text{or} = 6$$

$$a+b > 4 \text{ or} \leq 6, c+d > \text{or} = 10$$

$$a+b > 6 \text{ or} \leq 8, c+d > \text{or} = 12$$

herein $a$ is the number of methylene moieties in the polyol used to form the first polyester,
$b$ is the number of methylene moieties in the polyacid used to form the first polyester,
$c$ is the number of methylene moieties in the polyol used to form the second polyester of the blend,
$d$ is the number of methylene moieties in the polyacid used to form the second polyester of the blend; and (2) a blend of at least one non-linear polyester and one linear polyester, wherein the non-linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non-linear polyester is polyneopentyl adipate or polypropylene adipate; and (3) a blend of poly ε-caprolactone and at least one linear polyester selected from the group consisting of polyethylene adipate, polyethylene succinate and polybutylene succinate.

23 Claims, No Drawings

NON-HAIRING, MOISTURE CURABLE COMPOSITIONS

This is a continuation of application Ser. No. 07/201,169 filed Jun. 2, 1988, now abandoned.

FIELD OF THE INVENTION

This invention relates to polyurethane compositions useful as adhesives, coatings and sealants.

BACKGROUND

Polyurethane compositions are desirable in a variety of applications because of their excellent properties. They can be one-part and two-part solvent-borne systems, water-based systems or 100%-reactive solvent-free adhesive systems. Of particular utility are the reactive hot melt urethane adhesive systems which combine the rapid set or crystallization times of conventional hot melt adhesives with the high bond strengths of a curing system. Like conventional hot melts, the reactive hot melt urethane adhesives are solid at room temperature, melt to a viscous liquid when heated to moderate temperatures (82°–121° C.), and are applied in the molten state. The adhesive then cools to a solid state to provide initial bond strength (i.e., green strength) and additionally, cures on contact with ambient moisture to provide its final bond strength. These urethane-based systems are superior to conventional hot melt adhesives which lack resistance to solvents and heat, have lower bond strengths, and which can creep under load because they are non-curing.

In general, hot melt systems, including the urethane-based systems, suffer from the disadvantage of "stringing" or "hairing" during application at dispensing temperatures, especially in automated dispensing equipment. By stringing or hairing is meant that during application by extrusion, thin threads of the molten system form at the applicator tip when it is removed from the point where the hot melt adhesive has been deposited. Hairing is undesirable in many applications such as electronic assembly, because of the contamination it introduces. Additionally, hairing can contaminate the work station and application equipment.

The present invention overcomes this problem by providing a moisture curable, non-hairing hot melt composition of simple formulation In certain embodiments, the composition also exhibits improved crystallization rates and possesses high green strength

SUMMARY OF THE INVENTION

In accordance with the present invention there is provided a non-hairing, moisture curable hot melt composition comprising an isocyanate-terminated mixture of two or more hydroxy functional polymers at least one of which may be a liquid room temperature (about 25° C). The isocyanate-terminated mixture typically has a number average molecular weight of about 1,000 to 10,000 preferably of about 1,000 to 6,000, and most preferably of about 3,000 to 4,500. Additionally, the mixture preferably forms an essentially non phasing blend at application temperature (about 100° C.). By essentially non phasing is meant that, on visual inspection of the melt, there is no gross separation of the hydroxy functional polymers after extended (e.g., 1 hr.) heating at 100° C.

There is also provided a mixture of hydroxy functional polymers and a process for bonding, coating and/or sealing a substrate.

DETAILED DESCRIPTION OF THE INVENTION

The preparation of isocyanate-terminated prepolymers is well known in the art. Suitable prepolymers with residual isocyanate groups are formed by reaction of (1) a mixture of two or more hydroxy functional polymers wherein the total mixture generally has a combined number average molecular weight of about 1,000 to 10,000, preferably of about 1,000 to 6,000, and more preferably of about 3,000 to 4,500 and (2) a polyisocyanate, preferably a diisocyanate.

Examples of useful hydroxy functional polymers are polyester, polylactone, polyalkylene or polyalkylene ether, polyacetal, polyamide, polyesteramide or polythioether polyols. Preferred prepolymers are those based on linear aliphatic or slightly branched polyesters containing primary hydroxyl end groups. Other useful polyesters contain secondary hydroxyl or carboxyl end groups.

The prepolymer is preferably at least partially comprised of crystalline or semicrystalline polyester diols. Preferred polyesters have melting points between 30° C. and 80° C., most preferred between 40° C. and 60° C. Amorphous polyesters with glass transition temperatures up to 50° C. may be useful in blends at less than 50% total polyester weight. In certain cases liquid polyesters may be useful in blends of polyesters at less than 30% total polyester weight. Such preferred polyesters can be prepared by reacting a diol with a diacid or derivatives of diacids. Especially preferred are polyesters prepared by reacting short chain diols having the structure HO—(CH$_2$)$_x$—OH, where x is from 2 to 8, with diacids having the structure HOOC—(CH$_2$)$_y$—COOH, where y is from 1 to 10. Examples of useful diols include ethylene glycol, 1,4-butanediol, 1,6-hexanediol; 1,4-cyclohexane dimethanol, neopentyl glycol and 1,2-propylene glycol. Examples of useful diacids include adipic, azelaic, succinic, and sebacic acids. Small amounts of triols, polyethers and up to 30 mole percent of other diacids and anhydrides such as isophthalic, terephthalic, cyclohexane dicarboxylic acid and phthalic anhydride may also be useful in the preferred polyester-synthesis.

Examples of commercially available polyesters that are useful in the compositions of the invention are the "Lexorez" series commercially available from Inolex Chemical Co. Specific examples of such resins include Lexorez 1130-30P, Lexorez 1150-30P, and Lexorez 1110-25P Examples of other commercially available polyesters useful in the invention are the "Rucoflex" series of resins available from Ruco Polymer Corporation.

An example of a commercially available polylactone that is useful in the invention is "Tone-0260", commercially available from Union Carbide. Component ratios can be determined by the performance properties desired.

Preferred mixtures of hydroxy functional polymers are (1) linear polyester blends, wherein said polyester is the reaction product of a polyol and a polyacid, wherein $$a+b<or=4, c+d>or=6$$

$a+b > 4$ and $\leq 6$, $c+d > $ or $= 10$ $a+b > 6$ and $\leq 8$, $c+d > $ or $= 12$ wherein a is the number of methylene moieties in the polyol used to form the first polyester, b is the number of methylene moieties in the polyacid used to form the first polyester, c is the number of methylene moieties in the diol or polyol used to form the second polyester of the blend, d is the number of methylene moieties in the polyacid used to form the second polyester of the blend; or (2) a blend of at least one non-linear polyester and one linear polyester, wherein the non-linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non-linear polyester is polyneopentyl adipate or polypropylene adipate.

A blend of poly $\epsilon$-caprolactone and at least one linear polyester selected from the group consisting of polyethylene adipate, polyethylene succinate and polybutylene succinate.

Particularly preferred mixtures of hydroxy functional polymers are:

(1) linear polyester blends, wherein the polyester is the reaction product of a diol and a diacid, wherein $a+b=4$, $c+d >$ or $=6$ $a+b=6$, $c+d >$ or $=10$ $a+b=8$, $c+d >$ or $=12$ wherein a, b, c, and d are as described above.

(2) a blend of a linear and non linear polyesters, wherein the non linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate provided that when the linear polyester is polyhexamethylene sebacate, the non-linear polyester is polyneopentyl adipate or polypropylene adipate;

(3) a mixture of polyethylene adipate and polyhexamethylene adipate; or (4) a mixture of linear polyesters wherein one of the linear polyesters is poly $\epsilon$-caprolactone and the others are selected from the group consisting of polyethylene adipate, polyethylene succinate and polybutylene succinate.

The ratio of polyesters employed in the invention can vary in the composition. However, it has been found preferable to employ a weight ratio of first to second polyesters in the range of between about 85:15 to 15:85, more preferably 80:20 to 20:80, most preferably 70:30 to 30:70.

The polyisocyanates which are reacted with the hydroxy functional polymers to form the prepolymers used in the instant invention can be aliphatic or aromatic. Preferably they are aromatic diisocyanates such as diphenylmethane-2,4'-diisocyanate and/or 4,4'-diisocyanate; tolylene-2,4-diisocyanate and -2,6-diisocyanate and mixtures thereof. Other examples include: naphthylene-1,5-diisocyanate; triphenylmethane-4,4'4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate.

A list of useful commercially available polyisocyanates is found in the *Encyclopedia of Chemical Technology*, Kirk-Othmer, 2nd Ed., Vol. 12, pp. 46–47, Interscience Pub., N.Y. (1967), which is incorporated herein by reference. Especially preferable isocyanates include diphenylmethane-4,4'-diisocyanate (MDI) and tolylene-2,4-diisocyanate/tolylene-2,6-diisocyanate (TDI) and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as "Isonate 143L", commercially available from the Dow Chemical Co., and "Mondur CD", commercially available from Mobay Chemical Corp.; small amounts of polymeric diphenylmethane diisocyanates, preferably 10% or less by weight of the total isocyanate component, (e.g., "PAPI", and the series "PAPI 20" through "PAPI 901", commercially available from the Dow Chemical Co., "Mondur MR", "Mondur MRS", and "Mondur MRS-10", commercially available from Mobay Chemical Corp., and "Rubinate M", commercially available from ICI Chemicals, Inc.); and blocked isocyanate compounds formed by reacting aromatic isocyanates or the above-described isocyanate-functional derivatives with blocking agents such as ketoximes and the like. Such blocked isocyanate-functional derivatives, will for convenience, be regarded herein as isocyanate-functional derivatives of MDI and TDI.

The isocyanate should be present in the prepolymer composition in an equivalent amount greater than that of the hydroxy containing component. The equivalent ratio of isocyanate to hydroxyl is preferably from about 1.2 to about 10 to 1.0 and especially preferably from about 1.6 to 2.2 to 1.0.

The compositions of the invention can contain other ingredients or adjuvants if desired. For example, chain extension agents (e.g., short chain polyols such as ethylene glycol or butanediol) fillers (e.g. carbon black, metal oxides such as zinc oxide, and minerals such as talc, clays, silica, silicates, and the like), thermoplastic resins, plasticizers, antioxidants, pigments, U.V. absorbers, adhesion promoters such as silanes, and the like may be included to impart particular characteristics to the composition. They should be added only to the levels that do not interfere with the non-hairing characteristic of the composition. These adjuvants generally comprise up to 50 weight percent of the composition either individually or in combination.

In addition, the compositions can contain an effective amount of catalyst or reaction accelerator such as tertiary amines, metal-organic compounds, co-curatives such as oxazolidine, and the like. Dibutyltin dilaurate is a preferred metal organic catalyst. An effective amount of metal-organic catalyst is preferably from about 0.01 to 2 percent by weight of the prepolymer. More preferably, the catalyst is present at a level of about 0.05 to about 1 percent, based on the weight of the prepolymer.

The adhesive compositions of the invention may be prepared by mixing the components at elevated temperature, using conventional mixing techniques. It is preferred to mix the components under anhydrous conditions. Generally, preparation of the adhesive is done without the use of solvents.

The hot melt compositions of the invention achieve their initial, or green, strength through crystallization, then continue to cure by exposure to water, e.g., water vapor or moisture. High humidity and heat will provide an accelerated rate of cure while low humidity (e.g., 15% R.H. or less) will provide a slower rate of cure.

While the composition of the invention is preferably essentially non-phasing, some separation of the polyester components is acceptable. Moreover, the degree of phasing can be adjusted by varying any or several of certain factors. For example, the degree of chain extension of the polyester, the molecular weight of the polyester and the choice of isocyanate all influence phase separation. For example, as the molecular weight of the polyester decreases, the compatability of the blend increases. Additionally, as the NCO|OH ratio decreases the compatability of the components in the prepolymer increases. Moreover, simply varying the ratios of the polyester components influences their compatability as shown herein.

The compositions of the invention can be employed in any application where a high-performance adhesive, coating, or sealant is desired. They can be applied to a variety of articles and substrates, such as thermoplastic materials, thermosetting materials, foam material, wood, paper, leather, rubber, textiles, non-woven materials and bare and painted metals.

The following examples are offered to aid understanding of the present invention and are not to be construed as limiting the scope thereof. All parts are by weight unless otherwise stated.

EXAMPLES 1-7

Preparation and testing of isocyanate-terminated hydroxy functional polymer compositions.

In a 600 ml, stainless steel reactor with a gas inlet adapter and fitted with a cover having a rubber gasket, gas inlet and stirrer opening, the hydroxy functional polymer or mixture of polymers was heated to 100° C. with efficient stirring and nitrogen blanket. 4,4'-Diphenylmethane diisocyanate was added with stirring. The mixture was stirred under nitrogen for about 15 minutes and dibutyltin dilaurate (DBTDL) was added. Stirring was continued under vacuum for about 1 hour. Heating at 100° C. was maintained throughout. The resulting mixture was poured into nitrogen purged metal containers and sealed. The containers were stored in a dessicator.

viscosity determinations were made using a Brookfield RVF Viscometer and #27 spindle at 121° C. at 10 rpm or 20 rpm. Number average molecular weights (Mn) were determined by end group analysis.

The non-hairing property was determined by visual observation. If there were no strings or hairs trailing from a hot melt applicator nozzle, the composition was deemed non-hairing.

TABLE 1

| Polyol, OH eq. | Ex. 1 | Ex. 2 | Ex. 3 | Ex. 4 | Ex. 5 | Ex. 6 | Ex. 7 |
|---|---|---|---|---|---|---|---|
| PHA (1) | .55 | .55 | | 1 | | | |
| PEA (2) | .45 | | .45 | | 1 | | |
| PBA (3) | | .45 | .55 | | | 1 | |
| MDI NCO EQ | 2 | 2 | 2 | 2 | 2 | 2 | 2 |
| DBTDL (wgt. %) | .1 | .1 | .1 | .1 | .1 | .1 | .1 |

TABLE 1-continued

| Polyol, OH eq. | Ex. 1 | Ex. 2 | Ex. 3 | Ex. 4 | Ex. 5 | Ex. 6 | Ex. 7 |
|---|---|---|---|---|---|---|---|
| Visc. (Cps) | 12825 | 6550 | 10850 | 6150 | 5812 | 19375 | 6250 |
| Non-hair | yes | no | no | no | no | no | no |

(1) 1,6-Polyhexamethylene adipate, Hydroxyl No. 30 mg KOH/g sample, Mn 3741
(2) Polyethylene adipate, Hydroxyl No. 25 mg KOH/g sample, Mn 4489
(3) 1,4-Polybutylene adipate, Hydroxyl No. 30 mg KOH/g sample, Mn 3741

These Examples show that only compositions according to the invention are non-hairing.

EXAMPLES 8-9

The procedure and tests of Examples 1-7 was repeated. The results are given in Table 2.

TABLE 2

| Polyol OH eq. | Ex. 8 | Ex. 9 |
|---|---|---|
| PEA | .45 | |
| PBA | | .45 |
| PCP (1) | .55 | .55 |
| MDI NCO EQ | 2 | 2 |
| DBTDL (wgt. %) | .1 | .1 |
| Visc. (Cps) | 10088 | 13875 |
| Non-hair | yes | no |

(1) Poly ε-Caprolactone, Hydroxyl No. 37 mg KOH/g sample, Mn 3033

EXAMPLES 10-16

The following examples show the correlation between isocyanate-terminated polymer mixtures and polymer mixtures not reacted with isocyanate. The polymer mixtures are not reacted with the isocyanate for ease of handling.

Blends were prepared by manually stirring the components at a temperature of about 120° C. until well mixed, which was about 10 minutes. The presence or absence of hairing was determined by a visual inspection by observing if "hairs" of liquid adhesive form when a spatula contacting the surface of a melted sample was removed from that surface. If there were no "hairs", the composition was deemed to be non-hairing. This method correlates to application out of a hot melt applicator.

TABLE 3

| Example No. | PHA | Parts PEA | Parts PBA | Parts PCP | Non-Hairing |
|---|---|---|---|---|---|
| 10 | 50 | 50 | | | yes |
| 11 | 50 | | 50 | | no |
| 12 | | 50 | 50 | | no |
| 13 | | 50 | | 50 | yes |
| 14 | | | 50 | 50 | no |
| 15 | 100 | | | | no |
| 16 | | 100 | | | no |

A comparison of the results in Tables 1, 2 and 3 show that the results obtained with the isocyanate-reacted hydroxy functional polymers and the hydroxy functional polymers which were not reacted with the isocyanate are the same.

EXAMPLES 17-23

Using the same procedures as those in Examples 10-16, several blends of varying molecular weight are prepared and evaluated. Set out in the table below are the formulations and hairing property determination.

TABLE 4

| Ex. No. | PHA | PEA-25 (1) | PEA-55 (2) | PEA-110 (3) | Non-Hairing |
|---|---|---|---|---|---|
| 17 | 100 | | | | no |
| 18 | | 100 | | | no |
| 19 | | | 100 | | no |
| 20 | | | | 100 | no |
| 21 | 50 | 50 | | | yes |
| 22 | 50 | | 50 | | yes |
| 23 | 50 | | | 50 | no |

(1) Polyethylene adipate, Hydroxyl No. 25 mg KOH/g sample, Mn 4489
(2) Polyethylene adipate, Hydroxyl No. 55 mg KOH/g sample, Mn 2040
(3) Polyethylene adipate, Hydroxyl No. 110 mg KOH/g sample, Mn 1020

An analysis of these results show that the substitution of a component with its lower molecular weight analog affects the non-hairing characteristic of the composition.

EXAMPLES 24-37

Examples 24-37 illustrate the effect of varying the ratio of the amount of individual polyesters in the mixture. The blends were prepared using the same technique as in Examples 10-16. The results are shown in Table 5.

TABLE 5

| Ex. No. | Parts of PHA | Parts of PEA | Non-Hairing |
|---|---|---|---|
| 24 | 100 | | no |
| 25 | | 100 | no |
| 26 | 95 | 5 | no |
| 27 | 90 | 10 | no |
| 28 | 85 | 15 | no |
| 29 | 80 | 20 | borderline |
| 30 | 75 | 25 | yes |
| 31 | 70 | 30 | yes |
| 32 | 50 | 50 | yes |
| 33 | 25 | 75 | yes |
| 34 | 20 | 80 | borderline |
| 35 | 15 | 85 | no |
| 36 | 10 | 90 | no |
| 37 | 5 | 95 | no |

The results show that the ratio of components in the blend influences the non-hairing property.

EXAMPLES 38-82

Blends of polyesters in a 1:1 ratio by weight were prepared and tested for non-hairing using the following test method:

The 0.20 cm diameter end of a 14.6 cm long wooden dowel contacted the surface of a sample whose temperature was 121° C and was drawn away from that surface using an electric motor at a speed of 12 cm/second over a distance of 10.2 cm. If the adhesive "trail" from the dowel end was less than 7.6 cm long as it was being removed from the sample surface, the sample was deemed non-hairing. If it was more than 7.6 cm long, the sample was deemed to be hairing.

Results are set out in Table 6 below. For simplicity the following abbreviations are used:
a is the number of —CH$_2$— groups in the diol used to form the first polyester,
b is the number of —CH$_2$— groups in the diacid used to form the first polyester,
c is the number of —CH$_2$— groups in the diol used to form the second polyester,
d is the number of —CH$_2$— groups in the diacid used to form the second polyester.
PESu = polyethylene succinate, Mn 3740
PEA = polyethylene adipate, Mn 4489
PESe = polyethylene sebacate, Mn 4172
PBSu = 1,4-polybutylene succinate, Mn 5318
PBA = 1,4-polybutylene adipate, Mn 3741
PBSe = 1,4-polybutylene sebacate, Mn 3856
PBAz = 1,4-polybutylene azelate, Mn 3704
PHSu = 1,6-polyhexamethylene succinate, Mn 3591
PHA = 1,6-polyhexamethylene adipate, Mn 3741
PHSe = 1,6-polyhexamethylene sebacate, Mn 4922

TABLE 6

| Ex. No. | Polyester I | (a + b) | Polyester II | (c + d) | Non-Hairing |
|---|---|---|---|---|---|
| 38 | PESu | (4) | PEA | (6) | yes |
| 39 | PESu | (4) | PESe | (10) | yes |
| 40 | PESu | (4) | PBSu | (6) | yes |
| 41 | PESu | (4) | PBA | (8) | yes |
| 42 | PESu | (4) | PBSe | (12) | yes |
| 43 | PESu | (4) | PHSu | (8) | yes |
| 44 | PESu | (4) | PHA | (10) | yes |
| 45 | PESu | (4) | PHSe | (14) | yes |
| 46 | PEA | (6) | PESe | (10) | yes |
| 47 | PEA | (6) | PBSu | (6) | no |
| 48 | PEA | (6) | PBA | (8) | no |
| 49 | PEA | (6) | PBSe | (12) | yes |
| 50 | PEA | (6) | PHSu | (8) | no |
| 51 | PEA | (6) | PHA | (10) | yes |
| 52 | PEA | (6) | PHSe | (14) | yes |
| 53 | PBSu | (6) | PESe | (10) | yes |
| 54 | PBA | (8) | PESe | (10) | no |
| 55 | PESe | (10) | PBSe | (12) | no |
| 56 | PHSu | (8) | PESe | (10) | no |
| 57 | PESe | (10) | PHA | (10) | no |
| 58 | PESe | (10) | PHSe | (14) | no |
| 59 | PBSu | (6) | PBA | (8) | no |
| 60 | PBSu | (6) | PBSe | (12) | yes |
| 61 | PBSu | (6) | PHSu | (8) | no |
| 62 | PBSu | (6) | PHA | (10) | yes |
| 63 | PBSu | (6) | PHSe | (14) | yes |
| 64 | PBA | (8) | PBSe | (12) | yes |
| 65 | PBA | (8) | PHSu | (8) | no |
| 66 | PBA | (8) | PHA | (10) | no |
| 67 | PBA | (8) | PHSe | (14) | yes |
| 68 | PHSu | (8) | PBSe | (12) | yes |
| 69 | PHA | (10) | PBSe | (12) | no |
| 70 | PBSe | (12) | PHSe | (14) | no |
| 71 | PHSu | (8) | PHA | (10) | no |
| 72 | PHSu | (8) | PHSe | (14) | yes |
| 73 | PHA | (10) | PHSe | (14) | no |
| 74 | PESu | (4) | PBAz | (11) | yes |
| 75 | PEA | (6) | PBAz | (11) | yes |
| 76 | PESe | (10) | PBAz | (11) | no |
| 77 | PBSu | (6) | PBAz | (11) | yes |
| 78 | PBA | (8) | PBAz | (11) | no |
| 79 | PBAz | (11) | PBSe | (12) | no |
| 80 | PHSu | (8) | PBAz | (11) | no |
| 81 | PHA | (10) | PBAz | (11) | no |
| 82 | PBAz | (11) | PHSe | (14) | no |

These examples illustrate that the linear polyester blends useful in the compositions of the invention follow the general formula $$a+b < or = 4, c+d > or = 6$$

$$a+b > 4 \text{ and } \leq 6, c+d > or = 10$$

$$a+b > 6 \text{ and } \leq 8, c+d > or = 12$$

and that most preferably $$a+b = 4, c+d > or = 6$$

$$a+b = 6, c+d > or = 10$$

$$a+b = 8, c+d > or = 12$$

EXAMPLES 83-109

The following examples were prepared and tested as in Examples 38-82 using non-linear polyesters as one polyester component.

Polyester blends (1:1 ratio) and their non-hairing properties are set out in Table 7 below, where in addition to the abbreviations used in examples 38-82, the following abbreviations are used.

PNA = polyneopentyl adipate, Mn 2953
CHDMA = 1,4-polycyclohexanedimethyl adipate, Mn 3262
PCP = poly ε-caprolactone, Mn 3033
PPA = 1,2-polypropylene adipate, Mn 2373

TABLE 7

| Ex. No. | Polyester I | Polyester II | Non-Hairing |
|---------|-------------|--------------|-------------|
| 83 | PNA | PEA | yes |
| 84 | PNA | PESe | no |
| 85 | PNA | PBSu | yes |
| 86 | PNA | PBA | no |
| 87 | PNA | PBAz | no |
| 88 | PNA | PHA | no |
| 89 | PNA | PHSe | yes |
| 90 | CHDMA | PEA | yes |
| 91 | CHDMA | PBA | no |
| 92 | CHDMA | PBA | no |
| 93 | CHDMA | PBSu | yes |
| 94 | CHDMA | PHSe | no |
| 95 | PCP | PESu | yes |
| 96 | PCP | PESe | no |
| 97 | PCP | PBSu | yes |
| 98 | PCP | PBAz | no |
| 99 | PCP | PBSe | no |
| 100 | PCP | PHSu | no |
| 101 | PPA | PESu | yes |
| 102 | PPA | PEA | no |
| 103 | PPA | PESe | no |
| 104 | PPA | PBSu | no |
| 105 | PPA | PBA | no |
| 106 | PPA | PBAz | no |
| 107 | PPA | PBSe | yes |
| 108 | PPA | PHSu | no |
| 109 | PPA | PHSe | yes |

These examples illustrate useful combinations of non-linear and linear polyesters in the compositions of the invention that show the desired non-hairing property.

EXAMPLES 110-113

The following examples show the effect of the degree of phase separation (or incompatibility) on the green strength build-up of isocyanate-terminated hydroxy functional polymer compositions.

Blends were prepared as in Examples 1-7. In addition to the viscosity and non-hairing (determined as in Examples 1-7) measurements, the blends were tested for degree of phase separation and ability to hold a sustained load.

Phase separation was determined as follows:

Approximately one gram of molten polymer blend was placed on a microscope slide and the melt was drawn out into a 0.1 to 0.2 mm thick film. The slide was then placed in a 100° C. oven for 60 minutes, then removed from the oven, allowed to cool undisturbed at room temperature and the film was visibly inspected for the formation of circular and elongated domains. The percent of the total melt area occupied by these domains was recorded as the percent of phase separation.

Green strength build-up was determined as follows: A 0.5±0.05 g quantity of adhesive was extruded at 107° C., onto the center portion (about 5 cm from each end) of a 2.5 cm wide × 10 cm long × 0.8 cm thick piece of Douglas Fir. A timer was started. After 10 seconds, a second piece of Fir was bonded on its center point and at right angles to the first. Firm hand pressure was used to mate the surfaces. After a specified amount of time, a 4.5 kg tensile load was pneumatically applied to the 6.45 sq. cm bond area. The time at which the bond can support the 4.5 kg load was called the "4.5 kg tensile time". The results are reported in Table 8.

TABLE 8

| Polyol, OH eq. | Ex. 110 | Ex. 111 | Ex. 112 | Ex. 113 |
|---|---|---|---|---|
| PHA | 0.55 | 0.55 | 0.74 | 0.74 |
| PEA | 0.45 | 0.45 | 0.26 | 0.26 |
| MDI eq. | 2 | 1.8 | 2 | 1.8 |
| Tert. Amine Catalyst | 0.2 | 0.2 | 0.2 | 0.2 |
| Visc. (cps) | 7788 | 12700 | 6250 | 12050 |
| Non-hairing | yes | yes | yes | yes |
| Phase sep. (%) | 30 | 5 | 0 | 0 |
| 4.5 kg Tensile Time (minutes) | 2-15 | 1.5-2.5 | 1 | 1 |

It can be seen from the data that with increasing % phase separation, 4.5 kg tensile time increases and is variable. This variability in the times given in Ex. 110 and 111 was due to the variation in the melt that is being extruded, that is the extrudate may be rich in the PHA, which has a rapid crystallization rate, one time and the following extrudate rich in PEA, which has a slower crystallization rate.

What is claimed is:

1. A non-hairing, moisture curable, hot melt composition having a number average molecular weight of between about 1,000 and 10,000 comprising the reaction product of two or more hydroxy-functional polyesters with polyisocyanates wherein said hydroxy functional polyesters are selected from the group consisting of:
   (1) linear polyester blends, comprising a first and second polyester wherein each polyester is the reaction product of a polyol and a polyacid, wherein $a+b < or = 4, c+d > or = 6$ $a+b > 4$ and $\leq 6, c+d > or = 10$ $a+b > 6$ and $\leq 8, c+d > or = 12$ wherein a is the number of methylene moieties in the polyol used to form the first polyester,
   b is the number of methylene moieties in the polyacid used to form the first polyester,
   c is the number of methylene moieties in the polyol used to form the second polyester of the blend,
   d is the number of methylene moieties in the polyacid used to form the second polyester of the blend;
   (2) a blend of at least one non-linear polyester and one linear polyester, wherein the non-linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non-linear polyester is polyneopentyl adipate or polypropylene adipate; and
   (3) a blend of poly ε-caprolactone and at least one linear polyester selected from the group consisting of polyethylene adipate, polyethylene succinate and polybutylene succinate.

2. The hot melt composition of claim 1, wherein said hydroxy functional polyesters are selected from the group (1).

3. The hot melt composition of claim 1, wherein said hydroxy functional polyesters are selected from the group (2).

4. The hot melt composition of claim 1, wherein said hydroxy functional polyesters are selected from the group (3).

5. The hot melt composition of claim 1, wherein said hydroxy functional polyesters are selected from
   (1) linear polyester blends, wherein the polyester is the reaction product of a polyol and a polyacid, wherein $a+b>4, c+d>or =6$ $a+b>6, c+d>or =10$ $a+b>8, c+d>or =12$ wherein a is the number of methylene moieties in the polyol used to form the first polyester,
   b is the number of methylene moieties in the polyacid used to form the first polyester,
   c is the number of methylene moieties in the polyol used to form the second polyester,
   d is the number of methylene moieties in the polyacid used to form the second polyester;
   (2) a blend of a linear and non linear polyesters, wherein the non linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non linear polyester is polyneopentyl adipate or polypropylene adipate; or
   (3) a mixture of linear polyesters wherein one of the linear polyesters is poly ε-caprolactone and the others are selected from the group consisting of polyethylene adipate, polyethylene succinate and polybutylene succinate.

6. The hot melt composition of claim 1, wherein said hydroxy functional polyesters are a mixture of polyethylene adipate and polyhexamethylene adipate.

7. The hot melt composition of claim 1, wherein the weight ratio of polyethylene adipate to polyhexamethylene adipate is between 85:15 to 15:85.

8. The hot melt composition of claim 1, wherein the weight ratio is between about 80:20 and 20:80.

9. The hot melt composition of claim 1, wherein the weight ration is between about 70:30 and 30:70.

10. The hot melt composition of claim 1, wherein said polyisocyanates are aromatic diisocyanates.

11. The hot melt composition of claim 5, wherein said polyol is a saturated aliphatic diol containing from 2 to 8 carbon atoms.

12. The hot melt composition of claim 1, wherein said polyisocyanates are selected from the group consisting of diphenylmethane-4,4'-diisocyanate, tolylene-2,4-diisocyanate, tolylene-2,6-diisocyanate, and mixtures thereof.

13. The hot melt composition of claim 1, wherein said polyacid is selected from the group consisting of saturated aliphatic dicarboxylic acids containing 3 to 12 carbon atoms.

14. The hot melt composition of claim 1, wherein said composition contains a catalyst.

15. The hot melt composition of claim 14, wherein said catalyst is selected from the group consisting of tertiary amines, metal-organic compounds, and co-curatives.

16. The hot melt composition of claim 15, wherein the catalyst is dibutyltin dilaurate.

17. The hot melt composition of claim 15, wherein the catalyst is a metal-organic compound and is present in an amount of at least 0.01 percent, based on the weight of the composition.

18. The hot melt composition of claim 1, wherein the molecular weight of the hot melt composition is between 1000 and 6000.

19. A blend of hydroxy functional polymers comprising
   (1) linear polyester blends, comprising a first and second polyester wherein each polyester is the reaction product of a polyol and a polyacid, wherein $a+b<or =4, c+d>or =6$ $a+b>4$ and $\leq 6, c+d>or =10$ $a+b>6$ and $\leq 8, c+d>or =12$ wherein a is the number of methylene moieties in the polyol used to form the first polyester,
   b is the number of methylene moieties in the polyacid used to form the first polyester,
   c is the number of methylene moieties in the polyol used to form the second polyester of the blend,
   d is the number of methylene moieties in the polyacid used to form the second polyester of the blend;
   (2) a blend of at least one non-linear polyester and one linear polyester, wherein the non-linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non-linear polyester is polyneopentyl adipate or polypropylene adipate; or
   (3) a blend of poly ε-caprolactone and at least one linear polyester selected from the group consisting of polyethylene adipate, polyethylene succinate and polybutylene succinate.

20. A blend of hydroxy-functional polymers comprising
   (1) linear polyester blends, wherein the polyester is the reaction product of a diol and a diacid, wherein $a+b=4, c+d>or =6$ $a+b=6, c+d>or =10$ $a+b=8, c+d>or =12$ wherein a is the number of methylene moieties int he diol used to form the first polyester,
   b is the number of methylene moieties in the diacid used to form the first polyester, c is the number of methylene moieties int he diol used to form the second polyester, d is the number of methylene moieties int he diacid used to form the second polyester;

(2) a blend of a linear and non linear polyester, wherein the non linear polyester is selected from the group consisting of polyneopentyl adipate, polypropylene adipate and polycyclohexanedimethyl adipate, and the linear polyester is selected from the group consisting of polyethylene adipate, polybutylene succinate, and polyhexamethylene sebacate, provided that when the linear polyester is polyhexamethylene sebacate, the non linear polyester is polyneopentyl adipate or polypropylene adipate; or (3) a mixture of linear polyesters wherein one of the linear polyesters is poly $\epsilon$-caprolactone and the others are selected from the group consisting of polyethylene adipate, polyethylene succinate and polybutylene succinate.

21. The hot melt composition according to claim 11, wherein said polyol is selected from the group consisting of ethylene glycol, 1,4-butanediol, 1,6-hexanediol, and 1,2-hexanediol.

22. The hot melt composition of claim 13, wherein said dicarboxylic acids are selected from the group consisting of adipic acid, azelaic acid, succinic acid and sebacic acid.

23. The hot melt composition of claim 1, wherein each of said hydroxy function al polymers are solid at room temperature.

* * * * *

UNITED STATES PATENT AND TRADEMARK OFFICE
CERTIFICATE OF CORRECTION

PATENT NO. : 5,137,984

DATED : August 11, 1992

INVENTOR(S) : Lani S. Kangas, et. al.

It is certified that error appears in the above-indentified patent and that said Letters Patent is hereby corrected as shown below:

Col. 11, line 5, delete "the".

Col. 11, line 8, delete "the".

Col. 11, line 15, "a + b > 4
                          a + b > 6
                          a + b > 8"

should read     --a + b = 4
                          a + b = 6
                          a + b = 8--

Col. 11, line 55 "ration" should read --ratio--.

Col. 12, line 65 "int he" should read --in the--.

Col. 14, line 15 "function al" should read --functional--.

Col. 2, line 36, "HO-($CH_2$) -OH" should read --HO- $(CH_2)_x$-OH--.

Col. 7, line 21, "int he" should read --in the --.

Signed and Sealed this

Twenty-first Day of December, 1993

Attest:

BRUCE LEHMAN

*Attesting Officer*       *Commissioner of Patents and Trademarks*